United States Patent
Ukil et al.

(10) Patent No.: US 9,183,618 B2
(45) Date of Patent: Nov. 10, 2015

(54) METHOD, APPARATUS AND COMPUTER PROGRAM PRODUCT FOR ALIGNMENT OF FRAMES

(71) Applicants: Soumik Ukil, Bangalore (IN); Krishna Annasagar Govindarao, Bangalore (IN)

(72) Inventors: Soumik Ukil, Bangalore (IN); Krishna Annasagar Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 277 days.

(21) Appl. No.: 13/886,718

(22) Filed: May 3, 2013

(65) Prior Publication Data

US 2013/0301952 A1 Nov. 14, 2013

(30) Foreign Application Priority Data

May 9, 2012 (IN) .......................... 1822/CHE/2012

(51) Int. Cl.
  *G06T 5/00* (2006.01)
  *G06T 7/00* (2006.01)
  *G06T 3/00* (2006.01)

(52) U.S. Cl.
  CPC ............... *G06T 5/002* (2013.01); *G06T 3/0068* (2013.01); *G06T 7/0028* (2013.01)

(58) Field of Classification Search
  CPC ..... G06T 3/0068; G06T 5/002; G06T 7/0028; G06T 5/003; G06T 5/006; A61B 2017/00694
  See application file for complete search history.

(56) References Cited

U.S. PATENT DOCUMENTS

| | | | | |
|---|---|---|---|---|
| 7,616,836 B2 * | 11/2009 | Valadez | ......................... | 382/294 |
| 7,756,358 B2 | 7/2010 | Deng et al. | | |
| 2005/0163402 A1 * | 7/2005 | Aiso | .............................. | 382/300 |
| 2010/0142778 A1 * | 6/2010 | Zhuo et al. | .................... | 382/128 |

OTHER PUBLICATIONS

Ta et al., "SurfTrac—Efficient Tracking and Continuous Object Recognition Using Local Feature Descriptors", In IEEE Conference on Computer Vision and Pattern Recognition, 2009, 8 pages.
Battiato et al., "SIFT Features Tracking for Video Stabilization", 14th International Conference on Image Analysis and Processing, Sep. 10-14, 2007, 6 pages.
Fan et al., "Robust Scale Estimation from Ensemble Inlier Sets for Random Sample Consensus Methods", 10th European Conference on Computer Vision, Part III, Lecture Notes in Computer Science, vol. 5304, Oct. 12-18, 2008, pp. 182-195.
Shi et al., "Good Features to Track", IEEE Computer Society Conference on Computer Vision and Pattern Recognition, Jun. 21-23, 1994, 8 pages.

(Continued)

*Primary Examiner* — Edward Park
(74) *Attorney, Agent, or Firm* — Nokia Technologies Oy

(57) ABSTRACT

In an example embodiment a method, apparatus and computer program product are provided. The method includes accessing feature points in a first frame of a content, and aligning a second frame to the first frame based on determining a transformation matrix between the second frame and the first frame based on matching the feature points in the first frame with a corresponding feature points in the second frame. The method further includes aligning at least one subsequent frame from the second frame to the first frame by generating a modified first frame based on a transformation matrix between a preceding frame of a subsequent frame and the first frame, and determining a transformation matrix between the subsequent frame and the first frame based on matching a set of feature points in the modified feature points with corresponding feature points in the subsequent frame.

20 Claims, 9 Drawing Sheets

(56) References Cited

OTHER PUBLICATIONS

Rosten et al., "Machine Learning for High Speed Corner Detection", 9th European Conference on Computer Vision, Part I, Lecture Notes in Computer Science, vol. 3951, May 7-13, 2006, pp. 1-14.

Maurer et al., "A Linear Time Algorithm for Computing Exact Euclidean Distance Transforms of Binary Images in Arbitrary Dimensions", IEEE Transactions on Pattern Analysis and Machine Intelligence, vol. 25, Issue 2, Feb. 2003, pp. 265-270.

* cited by examiner

METHOD, APPARATUS AND COMPUTER PROGRAM PRODUCT FOR ALIGNMENT OF FRAMES

TECHNICAL FIELD

Various implementations relate generally to method, apparatus, and computer program product for alignment of frames.

BACKGROUND

Recently, there has been increasing interest in a form of media capture that bridges the gap between images and video, known as cinemagraphs or animated images. In an animated image, a part of the scene is in motion, while the background is static. From a consumer standpoint, the ability to freeze majority of a scene, and only have salient parts of the video active leads to a very engaging and creative user experience on a device. One of the main challenges in creating animated images from user-captured video on devices such as mobile phones is the problem of shaking of hand while capturing the video. To remove global motion introduced in such fashion the video needs to be stabilized or aligned, so that the effect of motion of the hand is negated.

SUMMARY OF SOME EMBODIMENTS

Various aspects of examples embodiments are set out in the claims.

In a first aspect, there is provided a method comprising: accessing a set of feature points in a first frame of a content, wherein the first frame selected from a plurality of frames of the content; aligning a second frame of the content to the first frame based on determining a transformation matrix between the second frame and the first frame, wherein the transformation matrix is determined based on matching the set of feature points in the first frame with a corresponding set of feature points in the second frame; and aligning at least one subsequent frame from the second frame to the first frame, wherein a subsequent frame is aligned to the first frame by performing: generating a modified first frame of the first frame based at least on a transformation matrix between a preceding frame of the subsequent frame and the first frame; and determining a transformation matrix between the subsequent frame and the first frame for aligning the subsequent frame to the first frame, wherein the transformation matrix is determined based on matching a set of feature points in the modified first frame with a corresponding set of feature points in the subsequent frame.

In a second aspect, there is provided an apparatus comprising at least one processor; and at least one memory comprising computer program code, the at least one memory and the computer program code configured to, with the at least one processor, cause the apparatus to perform at least: access a set of feature points in a first frame of a content, wherein the first frame selected from a plurality of frames of the content; align a second frame of the content to the first frame based on determining a transformation matrix between the second frame and the first frame, wherein the transformation matrix is determined based on matching the set of feature points in the first frame with a corresponding set of feature points in the second frame; and align at least one subsequent frame from the second frame to the first frame, wherein a subsequent frame is aligned to the first frame by performing: generating a modified first frame of the first frame based at least on a transformation matrix between a preceding frame of the subsequent frame and the first frame; and determining a transformation matrix between the subsequent frame and the first frame for aligning the subsequent frame to the first frame, wherein the transformation matrix is determined based on matching a set of feature points in the modified first frame with a corresponding set of feature points in the subsequent frame.

In a third aspect, there is provided a computer program product comprising at least one computer-readable storage medium, the computer-readable storage medium comprising a set of instructions, which, when executed by one or more processors, cause an apparatus to perform at least: access a set of feature points in a first frame of a content, wherein the first frame selected from a plurality of frames of the content; align a second frame of the content to the first frame based on determining a transformation matrix between the second frame and the first frame, wherein the transformation matrix is determined based on matching the set of feature points in the first frame with a corresponding set of feature points in the second frame; and align at least one subsequent frame from the second frame to the first frame, wherein a subsequent frame is aligned to the first frame by performing: generating a modified first frame of the first frame based at least on a transformation matrix between a preceding frame of the subsequent frame and the first frame; and determining a transformation matrix between the subsequent frame and the first frame for aligning the subsequent frame to the first frame, wherein the transformation matrix is determined based on matching a set of feature points in the modified first frame with a corresponding set of feature points in the subsequent frame.

In a fourth aspect, there is provided an apparatus comprising: means for accessing a set of feature points in a first frame of a content, wherein the first frame selected from a plurality of frames of the content; means for aligning a second frame of the content to the first frame based on determining a transformation matrix between the second frame and the first frame, wherein the transformation matrix is determined based on matching the set of feature points in the first frame with a corresponding set of feature points in the second frame; and means for aligning at least one subsequent frame from the second frame to the first frame, wherein a subsequent frame is aligned to the first frame by performing: generating a modified first frame of the first frame based at least on a transformation matrix between a preceding frame of the subsequent frame and the first frame; and determining a transformation matrix between the subsequent frame and the first frame for aligning the subsequent frame to the first frame, wherein the transformation matrix is determined based on matching a set of feature points in the modified first frame with a corresponding set of feature points in the subsequent frame.

In a fifth aspect, there is provided a computer program comprising program instructions which when executed by an apparatus, cause the apparatus to: access a set of feature points in a first frame of a content, wherein the first frame selected from a plurality of frames of the content; align a second frame of the content to the first frame based on determining a transformation matrix between the second frame and the first frame, wherein the transformation matrix is determined based on matching the set of feature points in the first frame with a corresponding set of feature points in the second frame; and align at least one subsequent frame from the second frame to the first frame, wherein a subsequent frame is aligned to the first frame by performing: generating a modified first frame of the first frame based at least on a transformation matrix between a preceding frame of the subsequent frame and the first frame; and determining a transformation matrix between the subsequent frame and the first frame for aligning the subsequent frame to the first frame, wherein the transformation matrix is determined based on matching a set of feature points in the modified first frame with a corresponding set of feature points in the subsequent frame.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 9 of the drawings.

Figure 1:
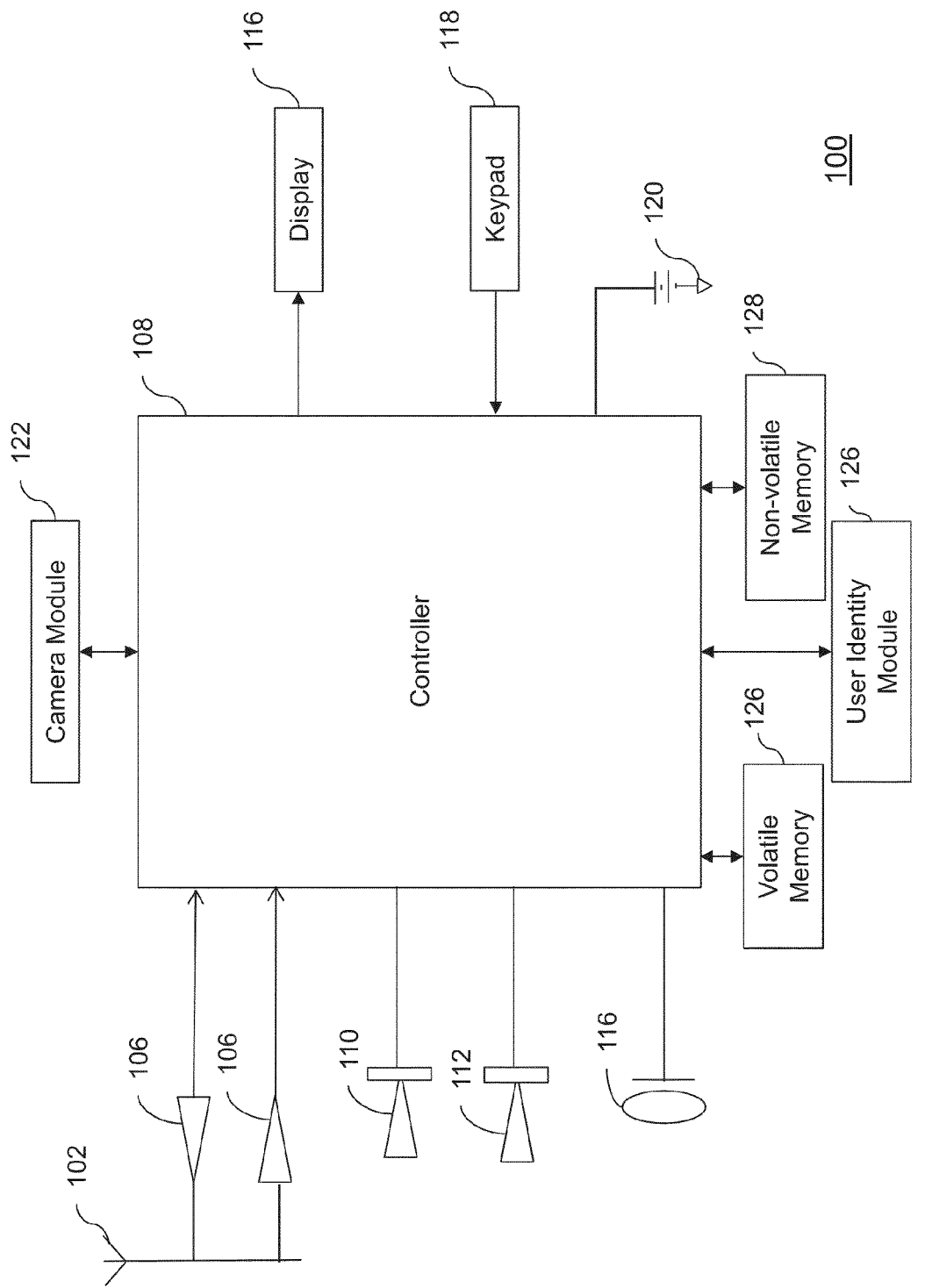
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
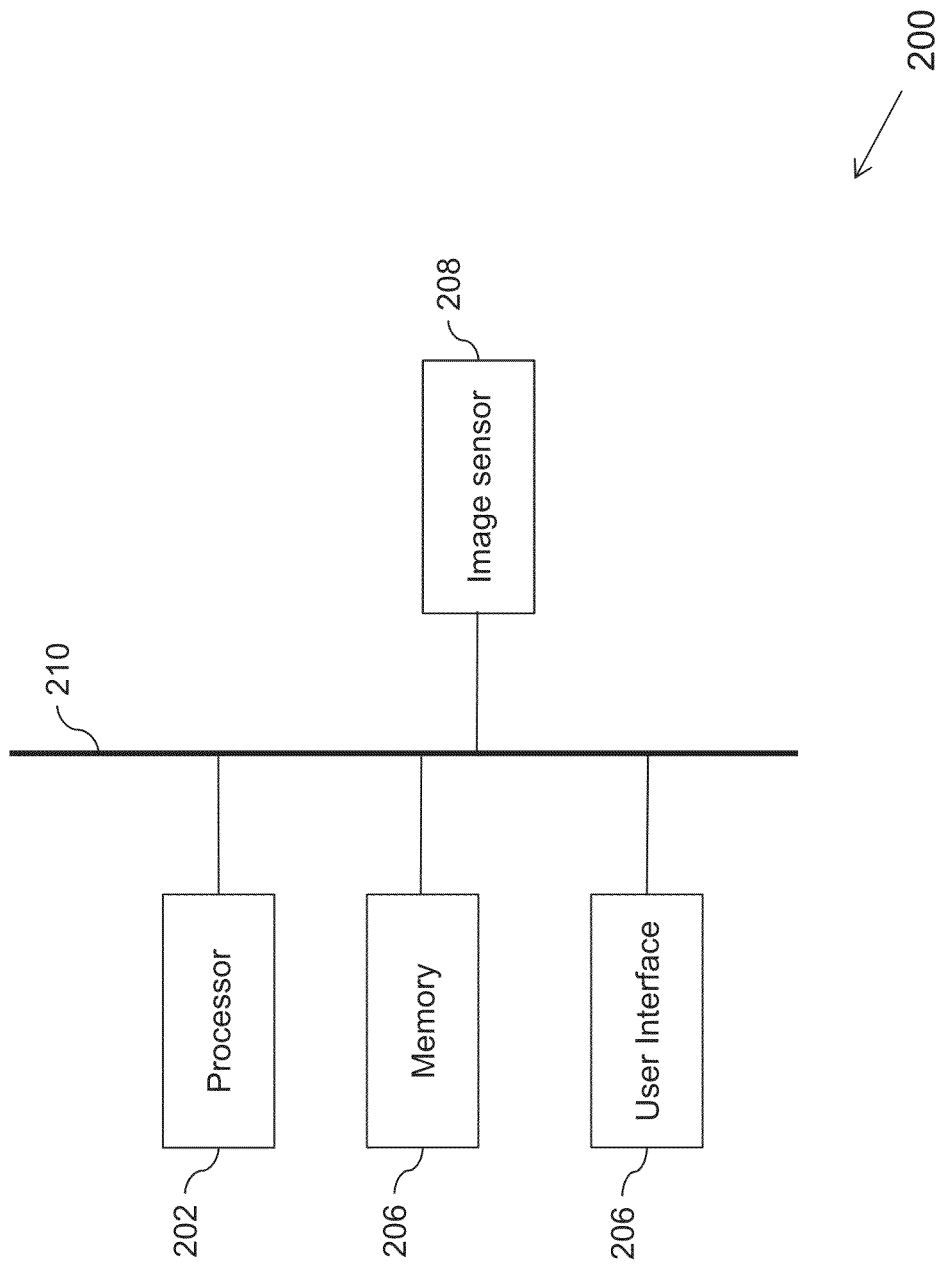
FIG. 2 illustrates an apparatus for alignment of frames of a content in accordance with an example embodiment.

FIG. 2 illustrates an apparatus 200 for aligning a plurality of frames of a content, in accordance with an example embodiment. In various example embodiment, the apparatus 200 is configured to generate animated images from the plurality of frames. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100.

These components (202-208) may communicate via a centralized circuit system 210 to perform estimation/computation of image parameters. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 200 is caused to, with the content of the memory 204, and optionally with other components described herein, to cause the apparatus 200 to align frames of a content for generating an animated image and/or stabilizing the frames of the content. Examples of the content may non-exhaustively include media content. Some examples of the media content may non-exhaustively include still images, animation, video, interactivity content forms, or other graphically represented electronic media. In an example embodiment, the content may include a collection of a plurality of frames of a video captured for the purposes of generating an animated image. In other example embodiments, the content may include a plurality of successively captured images. In an example embodiment, the image sensor 208 may be configured to capture the video or the plurality of images. In some example embodiments, the content may be prerecorded, stored in an apparatus 200, or may be received from sources external to the apparatus 200. In such example embodiments, the apparatus 200 is caused to receive the content from external storage medium such as DVD, Compact Disk (CD), flash drive, memory card, or received from external storage locations through the Internet, Bluetooth®, local area network, and the like. In an example embodiment, the apparatus 200 is caused to align some or all frames of the content for generating the animated image. For example, the content may have frames represented as $F1, F2, F3 \ldots$ and $Fm$. In an example embodiment, the apparatus 200 is caused to align the frames $F1, F2, F3 \ldots Fm$, with respect to a base frame selected from these frame, for example frame $F1$. In another example, frame $F3$ can be selected as a base frame. In an example embodiment, the base frame may be selected by a user operating the apparatus 200, software program/instructions, and/or by any other partial or completely automatic means. In an example embodiment, the base frame may be selected arbitrarily. In another example embodiment, the apparatus 200 is caused to align some of the frames, for example, $F1, F4, F7, F9 \ldots Fm-3$, and $Fm$ with respect to a base frame such as the frame $F1$. In such example embodiment, some frames such as $F2, F2, F5, F6 \ldots Fm-2$, and $Fm-1$, may not be utilized for alignment purposes for the generation of animated images. For example, some of the frames that are similar to one or more adjacent frames may not be utilized for the alignment purposes. In an example, frames of the content that are selected for the alignment purposes may be represented as K1, K2 . . . and Kn. It is to be noted that these selected frames K1, K2 . . . and Kn may be a subset of the frames F1, F2, F3 . . . Fm. In some example embodiment, the selected frames K1, K2 . . . and Kn may be same as the F1, F2, F3 . . . and Fm (in this example n is equal to m).

In an example embodiment, the processor 200 is caused to, with the content of the memory 204, and optionally with other components described herein, to cause the apparatus 200 to accessing a set of feature points in a first frame of the content. In various example embodiments, the first frame may be any selected frame such as $i^{th}$ frame (Ki) of the content, where 'i' may be any number from one to number of frames in the content. For instance, the first frame (K1) of the content may be selected the base frame, and the remaining frames K2, K3 and Kn are aligned to the frame K1. In an example representation, the set of feature points in the first frame K1 may be represented as PK1($x_i$, $y_i$), where 'i' can be any integer value. In an example embodiment, the apparatus 200 is caused to select the set of feature points from a plurality of feature points in the first frame. Examples of the feature points in a frame may include, but are not limited to, corners, edges of one or more objects in the frame, or other region of interest such as background or foreground in the frame. In an example embodiment, the set of feature points may be selected using a corner point detector. In an example embodiment, herein the first frame maybe selected as a base frame, as the remaining frames of the content are aligned to the selected first frame.

In an example embodiment, the processor 202 is caused to, with the content of the memory 204, and optionally with other components described herein, to cause the apparatus 200 to align remaining frames of the content to the first frame. In an example embodiment, the apparatus 200 is caused to align the second frame based on determining a transformation matrix between the second frame K2 and the first frame K1. In an example embodiment, the second frame K2 may be an adjacent frame to the first frame K1. In an example embodiment, the transformation matrix is determined based on matching the set of feature points in the first frame K1 with a corresponding set of feature points in the second frame K2.

In an example embodiment, the apparatus 200 is caused to determine a set of feature points (PK2(xi, yi)) in the second frame K2 corresponding to the set of feature points (PK1($x_i$, $y_i$)) in the first frame 'K1'. In an example embodiment, the feature points (PK2($x_i$, $y_i$)) are determined by performing a maximum cross-correlation match in a window around the points PK1($x_i$, $y_i$) in the frame K2. In various example embodiments, the size of the window is set to accommodate the maximum possible shift between consecutive frames K1 and K2. In an example embodiment, the window size can be of the order of a square of 10-15 pixels wide, however the window size can be chosen based on shaking of hand during capturing of frames of the content. In an example embodiment, the window size and location of the window size may also be selected based on an input from an accelerometer or from a video stabilization engine (that may provide a global motion between frames of the content) embodied in or otherwise accessible to the apparatus 200. In an example embodiment, the apparatus 200 is caused to perform a maximum cross-correlation matching and discard unreliable matches based on a threshold value, and determined a set of feature points PK2'($x_i$, $y_i$) corresponding to a set of feature points PK1'($x_i$, $y_i$) in the first frame K1.

In an example embodiment, the apparatus 200 is caused to determine a transformation matrix between the feature points $PK_1$'($x_i$, $y_i$) and $PK_2$'($x_i$, $y_i$). In an example embodiment, the transformation matrix between the feature points PK1'($x_i$, $y_i$) and PK2'($x_i$, $y_i$) may be obtained using scheme including, but not limited to, random sample consensus (RANSAC) algorithm. In various example embodiments for generating animated images from the frames (K1 . . . and Kn), the RANSAC algorithm may be based on a region of interest (ROI) associated with the frames. For instance, the apparatus 200 may be caused to access the ROI associated with the first frame. In an example embodiment, the ROI may correspond to a region in the first frame K1 that may change in the succeeding frames (K1, K2 . . . and Kn) of the content. The ROI may be accessed from an input received from a user operating the apparatus 200 or software program/instructions, or by any other partial or completely automatic means.

In an example embodiment, the apparatus 200 is caused to select the transformation matrix from a plurality of transformation matrices. In an example embodiment, the plurality of transformation matrices are computed based on correspondences between the feature points PK1'($x_i$, $y_i$) and PK2'($x_i$, $y_i$). In an example embodiment, the apparatus 200 is caused to determine a number of inliers in the plurality of transformation matrices based on the ROI. In an example representation, for a given transformation matrix, a feature point in the first frame K1 is considered an inlier based on a comparison of an euclidean distance between the feature point in the frame K1 and a corresponding transformed point in a transformed frame of the second frame K2 and an error tolerance value. For example, if a transformation matrix between frames K2 and K1 is represented as $T_{K2,K1}$, for a point (for example, PK2'($x_i$, $y_i$)) in the second frame K2, the corresponding transformed point in the first frame K1 may be PK1"($x_1$, $y_1$) that can be obtained by multiplying the transformation matrix and the feature point in the frame K2 (for example, PK1"($x_1$, $y_1$)=$T_{K2,K1}$*PK2'($x_1$, $y_1$)).

In an example embodiment, a feature point such as the point PK1'($x_1$, $y_1$) is considered as an inlier if the euclidean distance between the point PK1'($x_1$, $y_1$) and the transformed point PK1"($x_1$, $y_1$) is less than or equal to the error tolerance value (for example, d(PK1"($x_i$, $y_i$), PK1'($x_1$, $y_1$)+F(ROI)) <=e). In various example embodiments, the error tolerance value (e) is variable for the feature points that depends upon a function (denoted by 'F(ROI)') of location of the feature points with respect to the ROI. It should be noted that F(ROI) varies such that a smaller error tolerance value is selected for the feature points lying near a boundary of the ROI as compared to the feature points lying farther from the boundary of the ROI. In an example embodiment, the apparatus 200 is caused to select the transformation matrix from the plurality of transformation matrices that has the maximum number of inliers. Some example embodiments of selection of the transformation matrix are further described in FIG. 7.

In an example embodiment, the apparatus 200 is caused to generate a warped frame (WK$_2$) of the second frame K2 corresponding to the first frame K1 based on the transformation matrix ($T_{K2, K1}$) between the second frame K2 and the first frame K1. It should be noted that the warped frame ($W_{K2}$) of the second frame K2 is aligned to the first frame K1. In an example embodiment, the apparatus 200 is caused to store the warped frame ($W_{K2}$) storage location such as a video buffer that can be present in the memory 204, or in any other location embodied in the apparatus 200 or otherwise accessible to the apparatus 200.

In an example embodiment, the apparatus 200 is caused to align the subsequent frames (for example, K3, K4 . . . and Kn, where n>2 and is an integer) to the first frame K1 by matching a set of feature points in the subsequent frames with a set of feature points in a modified first frame. In an example embodiment, the first frame K1 is iteratively modified for aligning subsequent frames with the first frame such that the already modified first frame is re-modified for alignment of a next frame (of a current frame) with the first frame. In an example embodiment, for a subsequent frame, the apparatus 200 is caused to determine a modified first frame based on the first frame K1 and a warped frame of a preceding frame of the subsequent frame corresponding to the first frame. For instance, for aligning the frame K3, the modified first frame ($K1_{mod}$) may be determined based on the K1 and the warped frame of the preceding frame of the frame K3, for example, the warped frame of the frame K2. In an example embodiment, the modified first frame for the alignment of the frame K3 (denoted as '$K1_{mod(k3)}$') may be determined as per the following expression:

$$K1_{mod(K3)} = \alpha * K1 + (1-\alpha) * WK_2$$

where in some example embodiments, value of α is a parameter varying between 0.9 and 1. In an example embodiment, a value of 0.95 may be used. In an example embodiment, for alignment of subsequent frames, the first frame (K1) is modified dynamically based on the warped frame of the preceding frame of a current subsequent frame. For example, for aligning the first frame K1 to the $N^{th}$ frame (Kn), the modified first frame for the frame Kn (denoted as '$K1_{mod(kn)}$') may be determined as expression:

$$K1_{mod(kn)} = \alpha * K1 + (1-\alpha) * WK_{n-1}$$

In some example embodiments, the first frame K1 may be modified dynamically such that the most recent frames (n-1, n-2, n-3 . . . ) are given higher effect for aligning the frame Kn with the first frame K1. In such example embodiments, the first frame K1 may be modified for the frame Kn as per the following expression:

$$K1_{mod(kn)} = \alpha * K1_{mod(n-1)} + (1-\alpha) * WK_{n-1}$$

where $K1mod_{(n-1)}$ is the modified first frame used determined for aligning the frame K1 and the preceding frame Kn-1, and $WK_{n-1}$ is the warped frame of frame Kn-1 with respect to the first frame. In an example embodiment, the apparatus 200 is caused to determine a set of feature points (for example, $PK1_{mod(kn)}$ in the modified first frame for the frame Kn (for example, $K1_{mod(kn)}$).

In an example embodiment, for aligning the first frame K1 to a subsequent frame (K3, K4 . . . and Kn), the apparatus 200 is caused to determine a set of search points based on the first frame K1 and a transformation matrix between the first frame K1 and the preceding frame of the subsequent frame. For example, for aligning the frame K3 with the frame K1, the set of search points may be determined as $T_{K1, K2} * PK1'(x_1, y_1)$. In an example representation, for aligning the frame Kn to the frame K1, the set of search points may be determined as:

$$SKn(x_i, y_i) = T_{K1, Kn-1} * PK1'(x_i, y_i),$$

where $T_{K1, Kn-1}$ represents transformation matrix between first frame K1 and n-$1^{th}$ frame (Kn-1).

In an example embodiment, the apparatus 200 is caused to determine a set of feature points in the subsequent frame corresponding to the set of feature points in the modified first frame. For example, for aligning the $N^{th}$ frame (Kn) with the frame K1, the apparatus 200 is caused to determine set of feature points in the frame Kn corresponding to the set of feature points in the modified first frame for the frame Kn (for example, $PK1mod_{(Kn)}$). In an example embodiment, the apparatus 200 is caused to generate a transformation matrix between the subsequent frame and the frame K1 based on matching the set of feature points in the modified first frame with the corresponding set of feature points in the subsequent frame. For instance, for aligning the frame Kn to the frame K1, the apparatus 200 is caused to generate a transformation matrix ($T_{Kn, K1}$) based on correspondences between the set of feature points in the modified first frame (for example, $PK1_{mod(kn)}$) and the corresponding set of feature points in the frame Kn. In an example embodiment, the apparatus 200 is caused to determine the transformation matrix ($T_{Kn, K1}$) based on the RANSAC algorithm and the ROI, as described in determination of the transformation matrix $T_{K2, K1}$.

In an example embodiment, the apparatus 200 is caused to generate a warped frame of the subsequent frame with respect to the first frame K1 based on the transformation matrix between the subsequent frame and the first frame K1. For example, a warped frame of the frame Kn with respect to the first frame K1 is generated based on the transformation matrix ($T_{Kn, K1}$). In an example embodiment, the warped frame ($WK_n$) of the frame Kn is aligned to the first frame K1. It is noted that, the apparatus 200 is configured to align the subsequent frames K3, K4 and Kn to the first frame K1. In an example embodiment, the subsequent frames may be aligned to the first frame K1 in a sequential manner. In an example embodiment, the apparatus 200 is caused to store the warped frames for the subsequent frames (for example, $WK_3$, $WK_4$ . . . and $WK_n$) in the video buffer embodied in or otherwise accessible to the apparatus 200.

As the apparatus 200 is caused to generate warped frames of the frames K2, K3 . . . and Kn, these frames are aligned to the first frame K1 (as the warped frames of the frames K2, K3 . . . and Kn are aligned to the first frame K1). In this manner, the apparatus 200 aligns the frames K2, K3 . . . and Kn to the first frame K1. In an example embodiment, where the content is a collection of frames captured for generating an animated image, the apparatus 200 is caused to generate an animated image based on the first frame K1 and the warped frames ($W_{K2}$, $W_{K3}$, $W_{K4}$ . . . and $W_{Kn}$). It is noted that since the ROI corresponds to dynamic regions across the frames (K1, K2 . . . and Kn), whereas, various transformation matrices ($T_{K1, K2}$, $T_{K1, K3}$ . . . and $T_{K1, KN}$) are determined based on considering varying error tolerance values. For instance, stricter error tolerance values are considered while determining the transformation matrices in order to reduce alignment errors near the ROI boundary compared to other static regions in the frames (K1, K2 . . . and Kn).

Various example embodiments are also utilized for stabilization of a content that is collection of frames of a video. In an example embodiment, the processor 202, alongwith other components may be configured to include functionalities of a panning detector for usage in applications such as video stabilization. In video stabilization, for those frames that have a reasonable degree of overlap between the frames, various embodiments of the alignment used for the generation of the animated images may be utilized. For example, in frames K1, K2 . . . and Ks, where an overlap of more than a threshold level is present (that is identified by the panning detector that can detect a displacement between frames) between any pair of frames, feature points may be tracked from a base frame (for example, the frame K1) to the remaining frames K1, K2 . . . and Ks. If a displacement of a next frame (for example, Ks+1) with respect to the base frame K1 is detected as more than a threshold displacement (for example, the panned movement between the frames becomes more than the threshold displacement), feature points can be recomputed in the frame Ks+1 with respect to a new first frame. In an example embodiment, the new first frame may be a preceding frame of the frame Ks+1 (for example, Ks). In some example embodiments, feature points may be recomputed if the number of inliers for a transformation matrix between the frame Ks+1 and the first frame K1 is lower than a threshold number.

In various example embodiments, means for accessing a set of feature points in a first frame of a content, wherein the first frame selected from a plurality of frames of the content; means for aligning a second frame of the content to the first frame based on determining a transformation matrix between the second frame and the first frame, wherein the transformation matrix is determined based on matching the set of feature points in the first frame with a corresponding set of feature points in the second frame; and means for aligning at least one subsequent frame from the second frame to the first frame, wherein a subsequent frame is aligned to the first frame by performing: generating a modified first frame of the first frame based at least on a transformation matrix between a preceding frame of the subsequent frame; and determining a transformation matrix between the subsequent frame and the modified first frame for aligning the subsequent frame to the first frame, wherein the transformation matrix is determined based on matching the set of feature points in the modified first frame with a corresponding set of feature points in the subsequent frame. Such components may be configured by utilizing hardware, firmware and software components. Examples of such means may include, but are not limited to, the processor 202 along with the memory 204, the UI 206, the image sensor 208.

Figure 3:
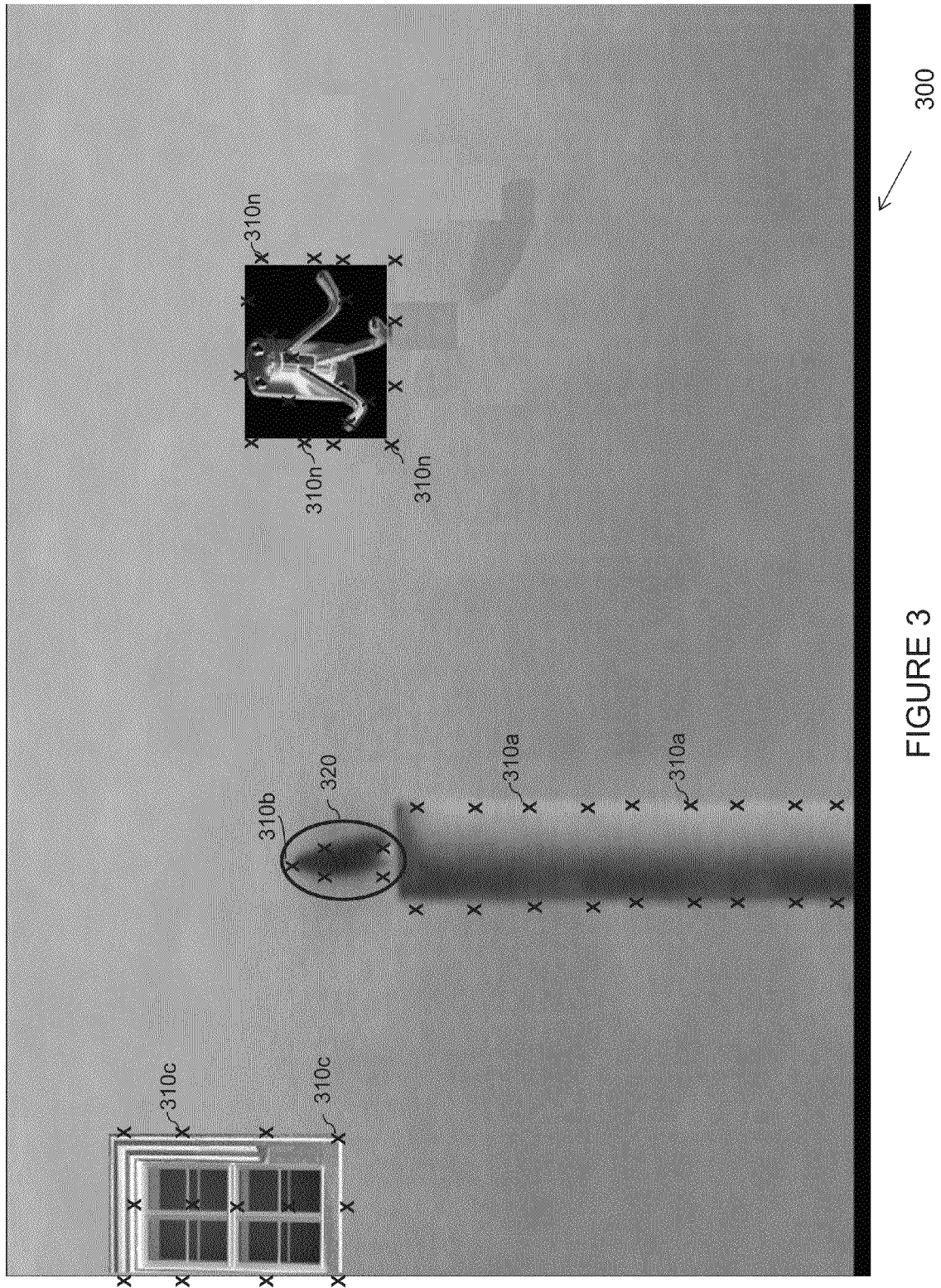
FIG. 3 illustrates an example frame of a content showing an ROI and feature points, in accordance with an example embodiment.

FIG. 3 illustrates an example frame 300 of a content showing an ROI and feature points, in accordance with an example embodiment. The frame 300 may be selected as a first frame of a content, and remaining frames of the content may be aligned to the frame 300 to generate an animated image. In FIG. 3, a set of feature points (PK1(xi, yi)) such as points 310a, 310b, 310c . . . 310n, are shown as X marks in an example representation. In an example embodiment, the feature points 310a, 310b, 310c . . . 310n may be selected using operators including, but not limited to, Harris corner detector, smallest univalue segment assimilating nucleus (SUSAN), scale-invariant feature transform (SIFT), features from accelerated segment test (FAST), and/or the Wang and Brady corner detection.

An ROI is also represented in the FIG. 3 that encompass a dynamic part (region of the frame 300 that is in motion in the succeeding frames of the frame 300) of the frame 300. An ROI corresponds to a region that encompass a dynamic part (for example, the region 320 (boundary around a flame) in the frame 300 that may change in the succeeding frames of the frame 300) in the frame 300.

Figure 4:
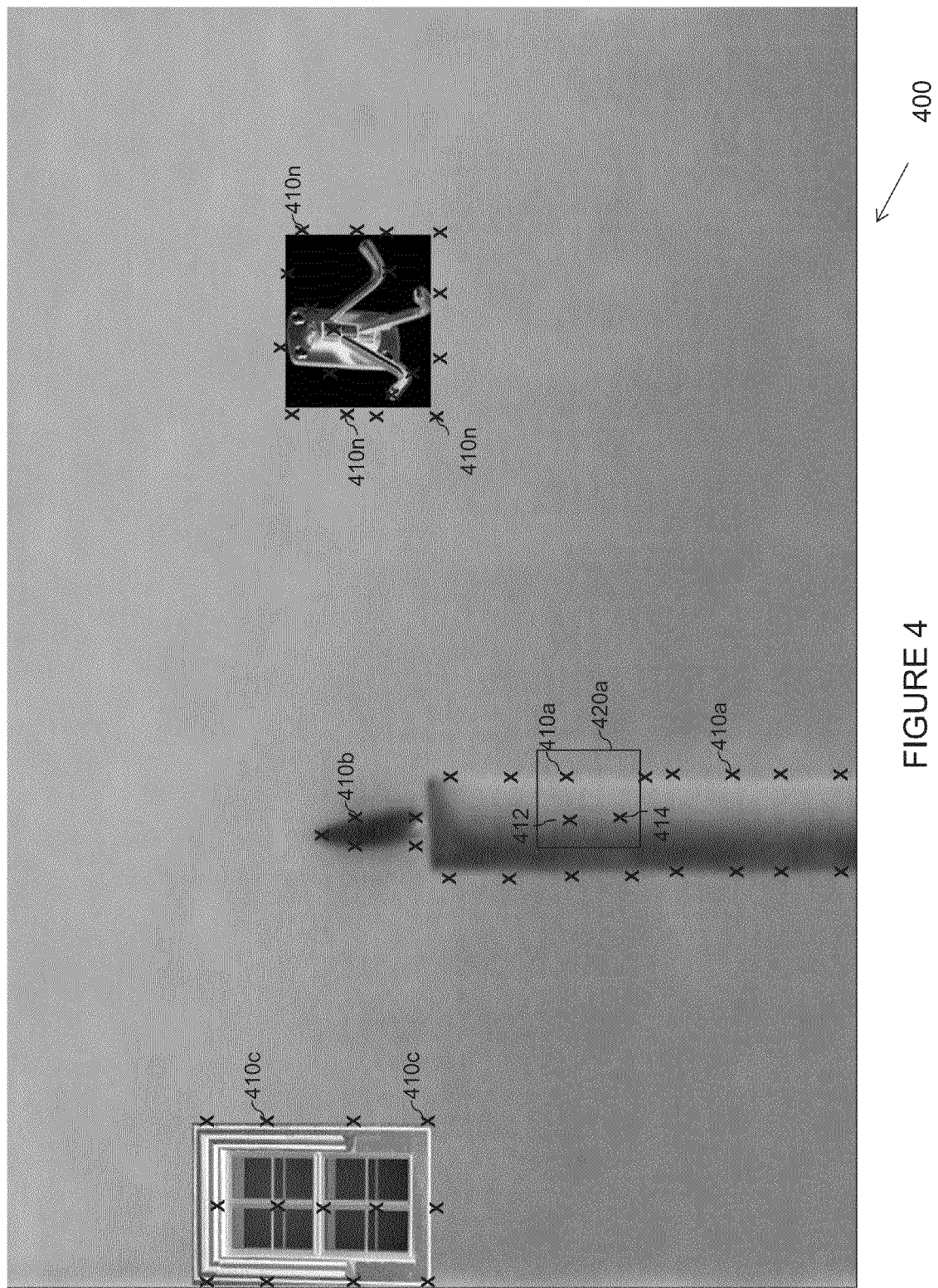
FIG. 4 illustrates an example frame of the content, in accordance with an example embodiment.

FIG. 4 illustrates an example frame 400 of the content, in accordance with an example embodiment. The frame 400 may be an adjacent frame of the frame 300 for the purposes of alignment, and a set of feature points corresponding to the feature points 310a, 310b, 310c . . . 310n may be determined in the frame 400. It should be noted that there may be a small handshake of the camera module while capturing the content (the frames 300 and 400), resulting into slightly misaligned frames 300 and 400. As shown in FIG. 4, a feature point in the frame 400 corresponding to a point 310a in the frame 300 may be obtained by a maximum cross-correlation match in a window 420a around the point 310a. In an example embodiment, the window 420a may be of a size of pre-determined pixels, for example, of 12×12 pixels.

As shown in FIG. 4, a feature point in the frame 400 is determined corresponding to the feature point 310a by performing a maximum cross-correlation matching of feature points lying in the window 420a (for example, the feature points 410a, 412 and 414). In an example embodiment, the apparatus 200 may be caused to determine one or more cross-correlation matchings of feature points (for example, the feature points 410a, 412 and 414) lying in the window 420a in the frame 400 around the feature point 310a with the feature point 310a in the frame 310. In an example embodiment, the apparatus 200 is caused to select the feature point (for example, the feature point 410a) in the frame 400 that has a maximum cross-correlation matching from among the one or more cross-correlation matchings. In this manner, the feature points 410b, 410c . . . 410n are determined corresponding to the feature points 310b, 310c . . . 310n.

Figure 5:
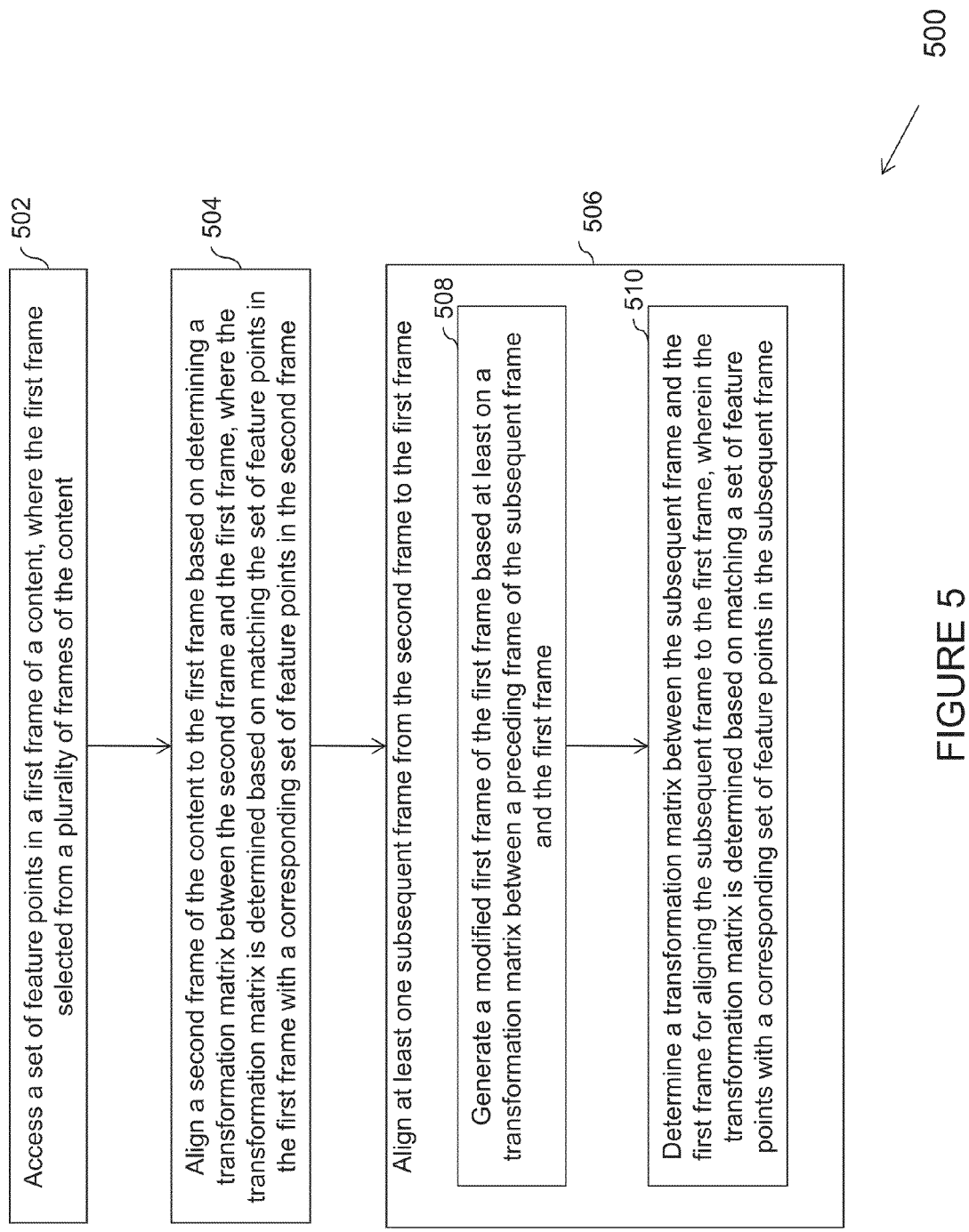
FIG. 5 is a flowchart depicting an example method for aligning a plurality of frames of a content, in accordance with an example embodiment.

FIG. 5 is a flowchart depicting an example method 500 for aligning a plurality of frames of a content, in accordance with an example embodiment. In various example embodiments, the plurality of frames are aligned for generating an animated image or for aligning frame of a video. The method 500 depicted in the flow chart may be executed by, for example, the apparatus 200 of FIG. 2.

At block 502, the method 500 includes accessing a set of feature points in a first frame of a content. In an example embodiment, the set of feature points may be accessed by using corner point detection in the first frame, as described in FIGS. 2 and 3. At block 504, the method 500 includes aligning a second frame of the content to the first frame based on determining a transformation matrix between the second frame and the first frame, wherein the transformation matrix is determined based on matching the set of feature points in the first frame with a corresponding set of feature points in the second frame. In an example embodiment, the second frame is an adjacent frame to the first frame.

At block 506, the method 500 includes aligning at least one subsequent frame from the second frame to the first frame. Alignment of a subsequent frame to the first frame is performed by blocks 508 and 510. At block 508, a modified first frame of the first frame is generated based at least on a transformation matrix between a preceding frame of the subsequent frame and the first frame. At block 510, the method 500 includes determining a transformation matrix between the subsequent frame and the first frame for aligning the subsequent frame to the first frame, wherein the transformation matrix is determined based on matching a set of feature points in the modified first frame with a corresponding set of feature points in the subsequent frame. In an example embodiment, the blocks 508 and 510 are performed for subsequent frames from the second frame and these frames are aligned to the first frame. Various example embodiments of aligning of frames of a content, generation of animated images of the content and/or stabilization of the content are further described in FIGS. 6, 7, 8 and 9.

FIGS. 6, 7, 8 and 9 are flowcharts depicting example methods for aligning a plurality of frames of a content and/or generation of animated images, in accordance with another example embodiments. Examples of the content may non-exhaustively include media content. Some examples of media content may non-exhaustively include still images, animation, video, interactivity content forms, or other graphically represented media. The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Figure 6:
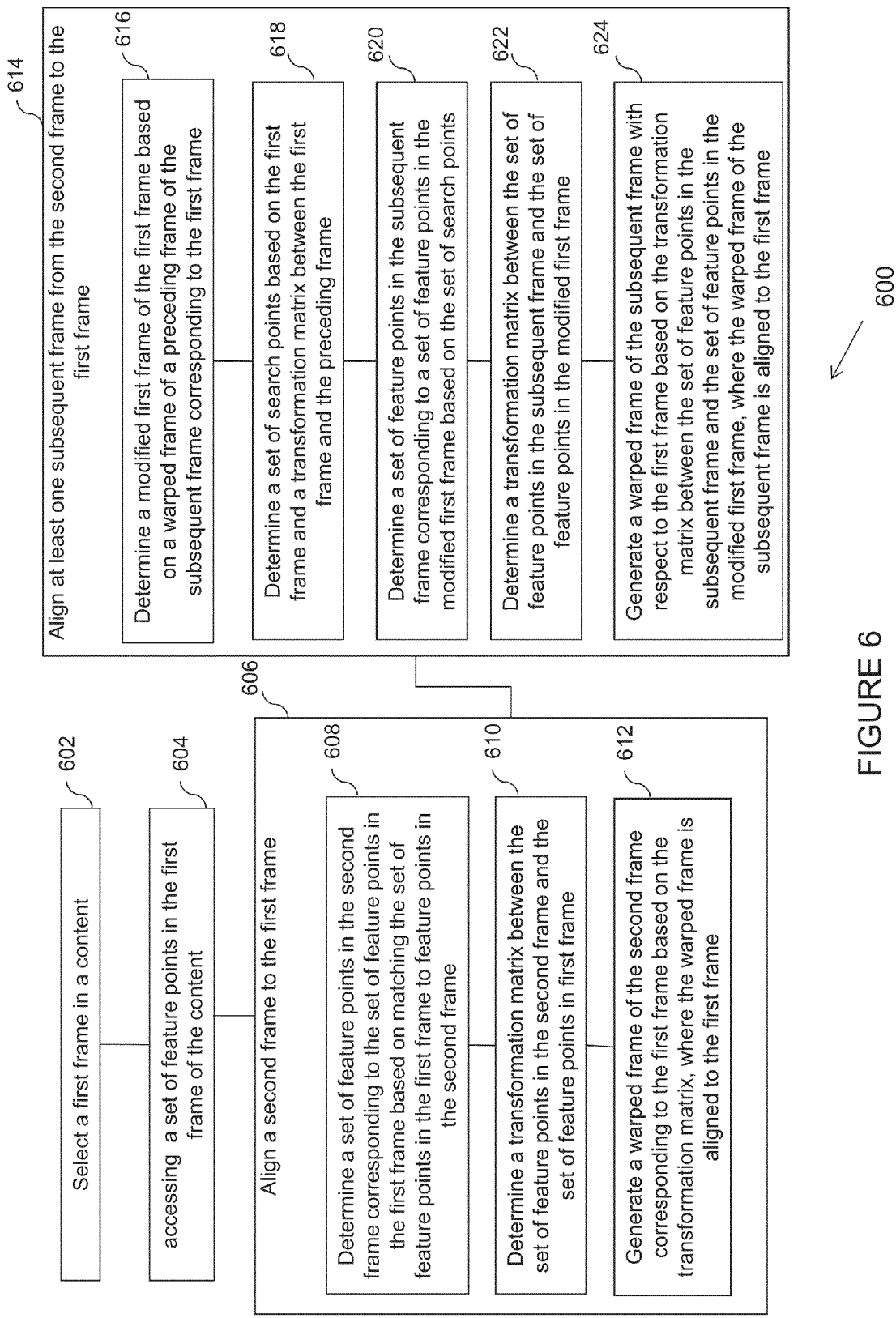
FIG. 6 is a flowchart illustrating an example method for generating an animated image, in accordance with an example embodiment.

FIG. 6 is a flowchart illustrating an example method 600 for aligning of frames of a content, in accordance with an example embodiment. At block 602, a first frame of a content is selected. In an example embodiment, the first frame may be an $i^{th}$ frame (Ki) of the content, where 'i' may be any number from one to number of frames in the content. For instance, the selected first frame maybe a base frame, and the remaining frames of the content are aligned to the selected first frame (base frame). For example, if K1 is selected as the first frames, the remaining frames K2, K3 . . . and Kn are aligned to the frame K1, as described in further blocks of the method 800. At block 604, a set of feature points are determined in the selected first frame. An example embodiment for the selection of feature points in the first frame K1 is described in FIG. 3.

At block 606, the second frame K2 of the content that is adjacent to the first frame K1 is aligned to the first frame K1. As illustrated in FIG. 6, the block 606 is performed by blocks 608, 610 and 612. At block 608, the method 600 includes determining the set of feature points in the second frame K2 corresponding to the set of feature points in the first frame K1. In an example embodiment, set of feature points in the second frame K2 are determined by performing a maximum cross-correlation match in a window around the feature points in the first frame K1 on the second frame K2, as described in FIG. 4.

At block 610, the method 600 includes determining a transformation matrix between the set of feature points in the second frame K2 and the set of feature points in first frame K1. In an example embodiment, the transformation matrix is selected from a plurality of transformation matrices determined based on correspondences between the set of feature points in the both frames K1 and K2. In an example embodiment, the transformation matrix is selected from the plurality of transformation matrices for which the number of inliers are maximum. In an example embodiment, the number of inliers in a given transformation matrix is dependent upon an error tolerance value that varies based on an ROI. An example embodiment of generating the transformation matrix is further described in FIG. 7.

At block 612, the method 600 includes generating a warped frame of the second frame K2 corresponding to the first frame K1 based on the transformation matrix between the second frame K2 and the first frame K1. It is noted that the warped frame of the frame K2 corresponding to the frame K1 is aligned to the frame K1.

At block 614, the method 600 includes aligning at least one subsequent frame to the first frame, for example, the frame K1. Herein, subsequent frames refer to frames succeeding to the second frame K2, for example, the frames K3, K4 . . . and Kn (where n is greater than 2 and is an integer). In an example embodiment, the frames K3, K4 . . . and Kn are aligned to the frame K1 in a sequential manner, and alignment (block 614) of the frames K3, K4 . . . and Kn is performed by iteratively performing the operations of the blocks 616-624.

At block 616, the method 600 includes determining a modified first frame based on the first frame K1 and a warped frame of a preceding frame of the subsequent frame corresponding to the first frame K1. For example, if the subsequent frame is the third frame K3, at block 616, a modified first frame is determined based on the frame K1 and the warped frame of the frame K2 (as K2 is a preceding frame of the frame K3). In another example, if the subsequent frame is the $n^{th}$ frame (Kn), the modified first frame is determined based on the frame K1 and the warped frame of the frame Kn-1. As the alignment of the frames K3, K4 . . . and Kn are performed sequentially, for determining a modified first frame for the frame Kn, the warped frame of the preceding frame (for example, Kn-1) is already available. In an example embodiment, the modified first frame is determined as per the expressions described in FIG. 2.

At block 618, the method 600 includes determining a set of search points based on the first frame and a transformation matrix between the first frame K1 and the preceding frame. For example, if the subsequent frame is K3, the set of search points may be determined based on the first frame and a transformation matrix between the first frame K1 and the second frame K2. In an example embodiment, the set of search points are feature points that are utilized for determining feature points in the subsequent frame corresponding to feature points in the modified first frame. For example, at block 620, a set of feature points are determined in the subsequent frame corresponding to the set of feature points in the modified first frame by matching points in windows around the set of search points. For example, in an example embodiment, a feature point in the subsequent frame corresponding to a point in the modified first frame may be determined by performing a maximum cross-correlation match in a window in the modified search frame where the window is defined around a search point of the set of search points.

At block 622, the method 600 includes determining a transformation matrix between the set of feature points in the modified first frame and the set of feature points in the subsequent frame. The transformation matrix may be determined by as described in FIG. 2, and is further described in FIG. 7. At block 624, the method 600 includes generating a warped frame of the subsequent frame with respect to the first frame K1. In an example embodiment, the warped frame of the subsequent frame is generated based on the transformation matrix (determined at block 622), where the warped frame of the subsequent frame is aligned to the first frame K1. It is noted that in an example embodiment, the warped frame is generated for the subsequent frames (by iteratively processing the block 614) for aligning the subsequent frames K3, K4 . . . and Kn to the first frame K1.

Figure 7:
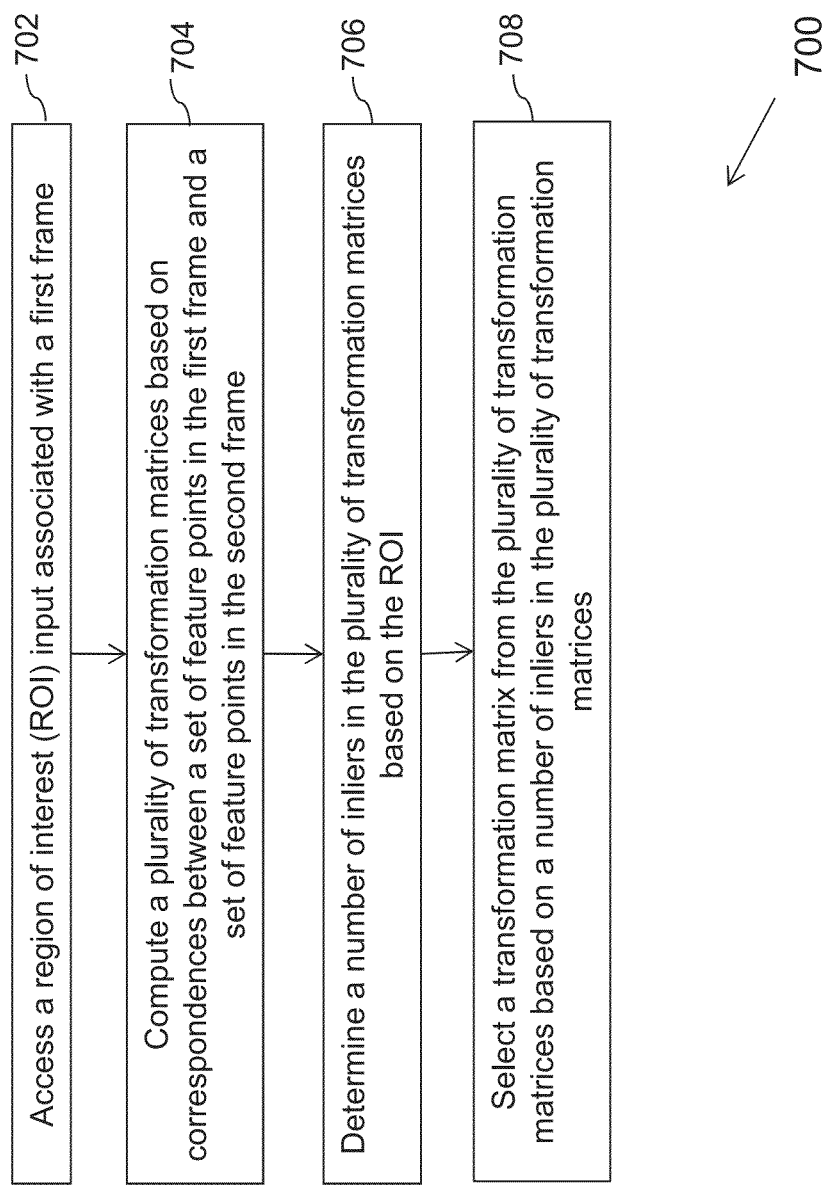
FIG. 7 is a flowchart illustrating an example method for determining a transformation matrix between two frames, in accordance with an example embodiment.

FIG. 7 is a flowchart illustrating an example method 700 for determining a transformation matrix between two frames, in accordance with an example embodiment. At block 702, the method 700 includes accessing a ROI information in a frame such as the first frame K1. The ROI information may be received from a user operating the apparatus 200 or software program/instructions, or by any other partial or completely automatic means. The ROI information corresponds to a region that encompass a dynamic part (for example, the region 320 in the frame 300 that may change in the succeeding frames of the frame 300) in the frame, as described in FIG. 3.

At block 704, the method 700 includes computing a plurality of transformation matrices based on correspondences between the set of feature points in the both frames such as a first frame and a second frame. It is noted that the first frame and the second frame can be any two frames of the content. In an example embodiment, a scheme such as the RANSAC algorithm may be used on the feature points of the both frames to find the plurality of transformation matrices. In an example embodiment, a transformation matrix is computed from randomly selected feature points in the first frame and the second frame. For example, by using various randomly selected feature points in the first frame and the second frame, the plurality of transformation matrices may be computed.

At block 706, the method 700 includes determining a number of inliers in the plurality of transformation matrices based on the ROI. In an example embodiment, determining a number of inliers in a transformation matrix comprises selecting a uniform error tolerance value for feature points and selecting weights to the feature points based on distances of the feature points from the boundary of the ROI. For example, in an example embodiment, for a given transformation matrix between the frame K1 and the frame K2, number of inliers are calculated based on the feature points in a frame such as the frame K1 that satisfies the following expression:

$$d(PK1''(x_i,y_i), PK1'(x_i,y_i)) + D_1(PK1'(x_i,y_i)) <= e,$$

where $PK1'(x_1, y_1)$ is a point in the frame K1; and $PK1''(x_1, y_1)$ is a transformed point on the frame K1 using the transformation matrix $(T_{K2, K1})$, (for example, $PK1''(x_1, y_1) = T_{K2, K1} * PK1'(x_1, y_1)$); and where $d(PK1''(x_i, y_i) PK1'(x_i, y_i))$ is the euclidean distance between the feature points $PK1'(x_1, y_1)$ and $PK1''(x_1, y_1)$; and where $D1 (PK1'(x_i, y_i))$ is a variable (weight) having values between 1 and 0. In an example embodiment, $D_1(PK1'(x_i, y_i))$ have a value of 1 if the point $PK1'(x_i, y_i)$ lie within the ROI boundary, and $D_1(PK1'(x_i, y_i))$ has a value gradually decreasing from 1 to 0, as $PK1'(x_i, y_i)$ is farther from the ROI boundary. In an representation, on a scaled euclidean distance map, D1 may be represented as $D_1 = 1 - D/D_{max}$, where D is a distance of a point from the ROI boundary, and $D_{max}$ is the maximum value of D. In this inverted distance map $D_1$, feature points at and inside the ROI have a value of 1, and it gradually reduces to 0 at the edges of the frame.

Various example embodiments provide a spatially varying error metric (error tolerance values) by using a distance map based on the ROI, such that a smaller error tolerance value is selected for the feature points lying closer to the boundary of the ROI as compared to the feature points lying farther from the boundary of the ROI. Specifically, feature points within a distance from ROI can have a smaller error tolerance while feature points outside of a distance from the ROI may have a larger error tolerance. For example, if the value of e=2 pixels, for a feature point lying at or within the boundary of the ROI, $D1(PK1'(x_i, y_i))=1$, so $d(PK1''(x_i, y_i), PK1'(x_i, y_i))$ has to be less than or equal to 1 for considering the feature point as inlier. Further, at the edge of the frame, $D1(PK1'(x_i, y_i))\sim=0$, so $d(Pa_1''(x_i, y_i), Pa_1'(x_i, y_i))$ has to be $<=2$ for the feature point to be an inlier. It is noted that by utilizing the spatially varying error metric, the resulting transformation matrix may have the least error near the ROI. It is to be further noted that alignment errors may be more noticeable near the ROI boundary compared to other regions as the scene is changing dynamically in the ROI, whereas at other places, the scene is frozen/static. Accordingly, the transformation matrix determined by various embodiments enhance the accuracy of alignment of two frames K1 and K2 in applications such as generating an animated image using the frames K1 and K2, as the ROI of the frame K2 (that may have been changed with respect to the frame K1) may be added to the frame K1 to generate the animated image.

At block 708, the method 700 includes selecting the transformation matrix from the plurality of transformation matrices based on a number of inliers in the plurality of transformation matrices. In an example embodiment, a transformation matrix, which has the maximum number of inliers, is selected as the transformation matrix between the frames K1 and K2.

Figure 8:
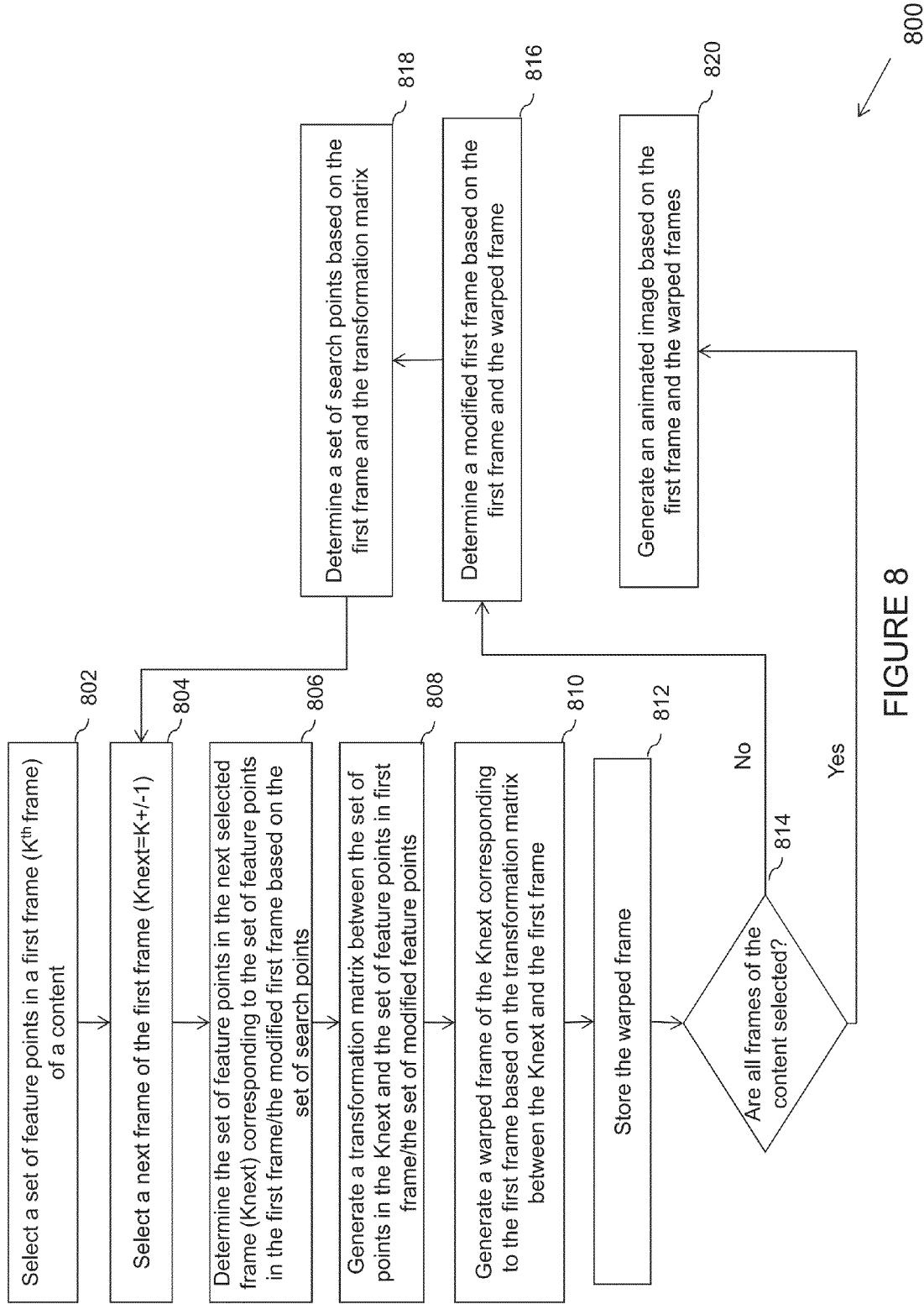
FIG. 8 is a flowchart illustrating an example method for generating an animated image, in accordance with an example embodiment.

FIG. 8 is a flowchart illustrating an example method 800 for generating an animated image, in accordance with an example embodiment. At block 802, the method 800 includes selecting a set of feature points in a first frame of a content. In an example embodiment, the first frame may be an $i^{th}$ frame of the content, where 'i' may be one or a number equal to number of frames in the content. For example, a first frame (i=1) of the content or any other frame of the content may be selected. As described in FIG. 2, the feature points in the first frame may be determined based on corner point detectors.

At block 804, a next frame to the first frame is selected. For example, a second frame of the content is selected. In an example embodiment, the second frame is the adjacent frame of the first frame. In an example embodiment, the second frame is immediate succeeding frame of the first frame. In some example embodiments, the second frame may be immediate preceding frame of the first frame, where the first frame is the last frame of the content.

At block 806, the method 800 includes determining feature points in the next selected frame, for example, the second frame (K2) corresponding to the first frame (K1). In an example embodiment, the set of feature points in K2 may be determined by cross-correlation matching in windows across feature points in the frame K2, as described in FIG. 4.

At block 808, a transformation matrix is determined between the first frame K1 and the second frame K2. In an example embodiment, as described in FIG. 7, the transformation matrix is selected from a plurality of transformation matrices between the frames K1 and K2 based on various correspondences between set of feature points of the both frames K1 and K2. In an example embodiment, the transformation matrix is selected from the plurality of transformation matrices for which the number of inliers are maximum, as described in FIG. 7. The number of inliers are dependent upon an error tolerance value that varies based on an ROI in the first frame, as described in FIG. 7.

At block 810, a warped frame of the second frame K2 with respect to the first frame K1 is generated based on the transformation matrix between the second frame K2 and the first frame K1. In an example embodiment, the warped frame of the second frame K2 is aligned to the first frame K1.

At block 812, the warped frame of the second frame K2 is stored in a storage location such as a video buffer that can be present in the memory 204, or in any other location embodied in the apparatus 200 or otherwise accessible to the apparatus 200.

At block 814, it is checked whether all frame of the content are selected. It is noted that if all frames are not selected, it indicates that the warped frames for all frame of the content are not generated. In some example embodiments, it may also be checked whether warped frames for all frames of the content are generated at block 814.

At block 816, the method 800 includes generating a modified first frame based on the first frame and the warped frame. For example, the modified first frame ($K1_{mod}$) is determined based on the first frame K1 and the warped frame of the second frame K2. In an example embodiment, the modified first frame may be generated as described in FIG. 2.

At block 818, the method 800 includes determining a set of search points. In an example embodiment, the set of search points are determined based on the first frame ($K1_{mod}$) and the transformation matrix between the frame K1 and frame K2.

As the set of search points are determined, the method 800 proceeds to the block 804, where the next frame, for example, the third frame K3 is selected. At block 806, a set of feature points are determined in K3 that correspond to the set of feature points in the modified first frame using the set of search points. At block 808, a transformation matrix is determined between the feature points in the frame K3 and the set of feature points in the modified first frame. At block 810, a warped frame of the frame K3 corresponding to the frame K1 is generated based on the transformation matrix, and the warped frame is stored in the memory. It should be noted that for generating the warped frame of the frame K3, the set of feature points in the frame K3 are determined based on matching these feature points with the set of feature points in the modified first frame. It is noted that after generating warped frame of a current frame (such as any frame of the frames K2, K3, K4, . . . and Kn-1) the modified first frame ($K1_{mod}$) (used for generating the warped frame of the current frame) is re-modified to generate the modified first frame that is used for generating the warped frame for the next frame of the current frame. For instance, the set of feature points in the modified first frame are used to determine matched set of feature points in the next frames of the (K3, K4 . . . and Kn).

The operations of the blocks 804-818 are performed until all frames of the content are selected. It is noted that as all frames of the content are selected, warped frames for the frames K2, K3 . . . and Kn are generated corresponding to the frame K1. As the warped frames for the frames K2, K3 . . . and Kn are generated, the method 800 proceeds to block 820. At block 820, an animated image is generated based on the first frame K1, and the warped frames for the frames K2, K2 . . . and Kn. In an example embodiment, the first frame K1 and the warped frames of the frames K2, K2 . . . and Kn are stitched together to generate the animated image. In some example embodiments, ROI of the warped frames of the frames K2, K2 . . . and Kn may be stitched with the first frame K1 to generate the animated image.

Figure 9:
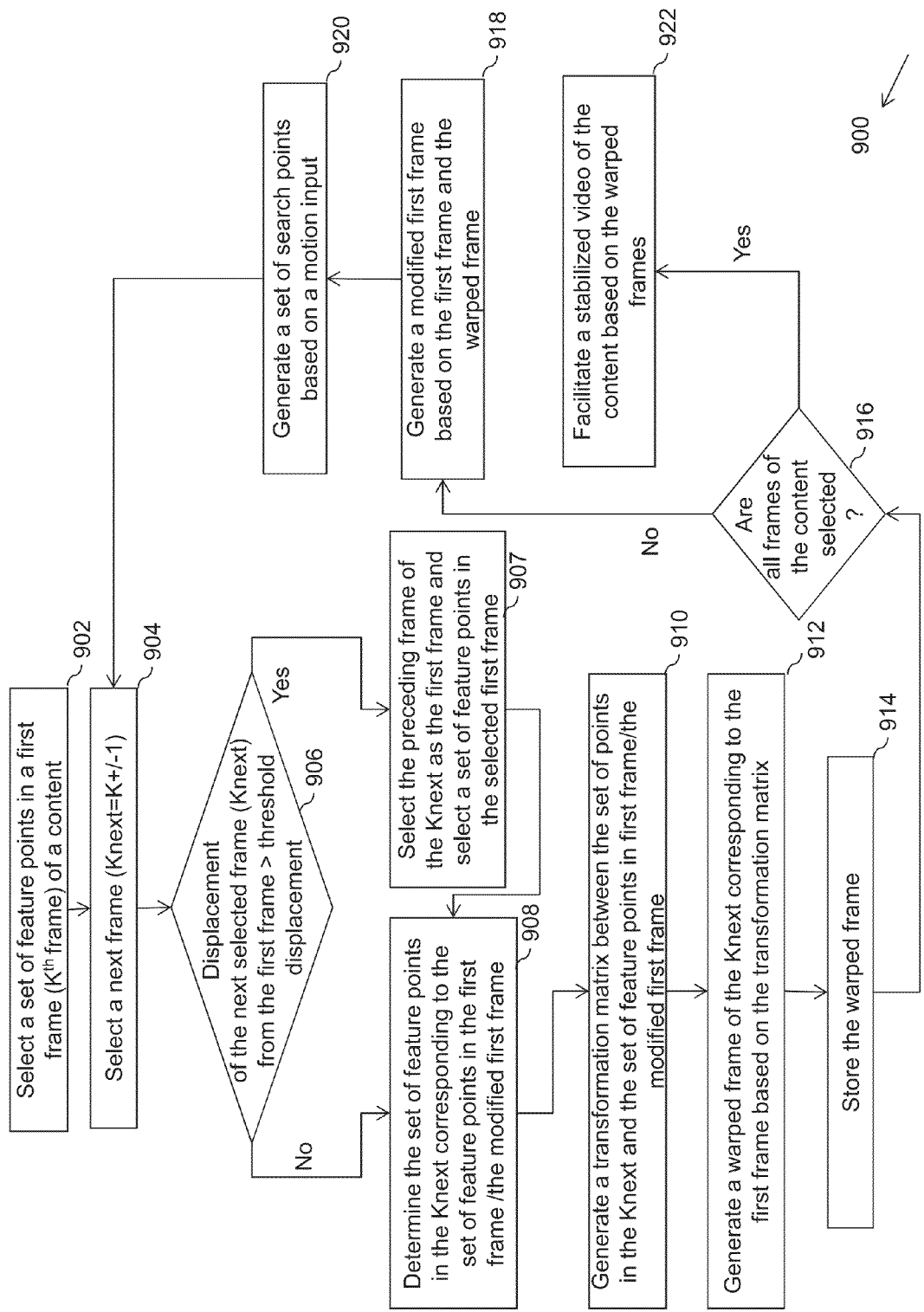
FIG. 9 is a flowchart illustrating an example method for facilitating a stabilized video, in accordance with an example embodiment.

FIG. 9 is a flowchart illustrating an example method 900 for video stabilization, in accordance with an example embodiment. At block 902, the method 900 includes selecting a set of feature points in a first frame of a content. In an example embodiment, the first frame may be an $i^{th}$ frame of the content, where 'i' may be a number between one to a number of frames in the content utilized for the video stabilization.

At block 904, a next frame to the first frame is selected. For example, a second frame of the content is selected. In an example embodiment, the second frame is the adjacent frame of the first frame, for example, an immediate succeeding frame of the first frame. In some example embodiments, the second frame may be immediate preceding frame of the first frame, where the first frame is the last frame of the content.

At block 906, the method 900 includes detecting a motion between the first frame and the next frame (Knext). If it is detected that the motion between the first frame and the next selected frame (for example, Knext is the second frame K2) is less than a threshold displacement, the method 900 proceeds to 908.

At block 908, the method 900 includes determining feature points in the next selected frame (Knext), for example, the second frame (K2) corresponding to the first frame (K1). In an example embodiment, the set of feature points in K2 may be determined by cross-correlation matching in windows across feature points in the frame K2, as described in FIG. 4.

At block 910, a transformation matrix is determined between the first frame K1 and the second frame K2. In an example embodiment, as described in FIG. 7, the transformation matrix is selected from a plurality of transformation matrices between the frames K1 and K2 based on various correspondences between set of feature points of the both frames K1 and K2. In an example embodiment, the transformation matrix is selected from the plurality of transformation matrices for which the number of inliers are maximum, as described in FIG. 7. The number of inliers are dependent upon an error tolerance value that varies based on an ROI in the first frame, as described in FIG. 7.

At block 912, a warped frame of the second frame K2 with respect to the first frame K1 is generated based on the transformation matrix between the second frame K2 and the first frame K1. In an example embodiment, the warped frame of the second frame K2 is aligned to the first frame K1. At block 914, the warped frame of the second frame K2 is stored in a storage location such as a video buffer that can be present in the memory 204, or in any other location embodied in the apparatus 200 or otherwise accessible to the apparatus 200.

At block 916, it is checked whether all frame of the content are selected. It is noted that if all frames are not selected, it indicates that the warped frames for all frame of the content are not generated. In some example embodiments, it may also be checked whether warped frames for all frames of the content are generated at block 916.

At block 918, the method 900 includes generating a modified first frame based on the first frame and the warped frame. For example, the modified first frame ($K1_{mod}$) is determined based on the first frame K1 and the warped frame of the second frame K2. In an example embodiment, the modified first frame may be generated as described in FIG. 2.

At block 920, the method 900 includes determining a set of search points. In an example embodiment, the set of search points are determined based on a motion input from motion sensors such as a panning detector.

As the set of search points are determined, the method 900 proceeds to the block 904, where the next frame, for example, the third frame K3 is selected. At block 906, if it is determined that displacement of the third frame K3 from the first frame K1 is less than or equal to the threshold displacement, the method proceeds to the block 908, where a set of feature points are determined in the frame K3 that correspond to the set of feature points in the modified first frame. Further, at block 910, a transformation matrix is determined between the feature points in the frame K3 and the set of feature points in the modified first frame. At block 912, a warped frame of the frame K3 corresponding to the frame K1 is generated based on the transformation matrix, and the warped frame is stored in the memory. It should be noted that for generating the warped frame of the frame K3, the set of feature points in the frame K3 are determined based on matching these feature points with the set of feature points in the modified first frame.

In an embodiment, at block 906, if it is determined that the displacement of the frame K3 from the first frame K1 is greater than the threshold displacement, the preceding frame of the frame K3 (for example, the frame K2) is selected as the first frame (base frame) at block 907, and a set of feature points are selected in the selected first frame (for example, K2) at the block 907. Further, the method 900 proceeds to the block 908, where a set of feature points in the next selected frame (K3) are determined corresponding to the selected first frame (K2) instead of the first frame K1 or the modified first frame.

It is noted that after generating warped frame of a current frame (such as any frame of the frames K2, K3, K4, ... and Kn-1) the modified first frame ($K1_{mod}$) (used for generating the warped frame of the current frame) is re-modified to generate the modified first frame that is used for generating the warped frame for the next frame of the current frame. For instance, the set of feature points in the modified first frame are used to determine matched set of feature points in the next frames of the (K3, K4 ... and Kn). However, if a displacement of a next selected frame from the first frame is greater than the threshold displacement, a preceding frame of the next selected frame is selected as the first frame, and the feature points in the next selected frame are determined corresponding to the selected first frame (for example, the preceding frame of the next selected frame).

The operations of the blocks 904-920 are performed until all frames of the content are selected. It is noted that as all frames of the content are selected, warped frames for the frames K2, K3 ... and Kn are generated corresponding to the frame K1. As the warped frames for the frames K2, K3 ... and Kn are generated, the method 900 proceeds to block 922. At block 922, a stabilized video of the content is facilitated based on the warped frames for the frames K2, K2 ... and Kn, as the warped frames K2, K2 ... and Kn are aligned to the frame K1.

To facilitate discussions of the methods 600, 700, 800 and/or 900 of FIGS. 6-9, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 600, 700, 800 and/or 900 are performed in an automated fashion. These operations involve substantially no interaction with the user. Other operations of the methods 600, 700, 800 and/or 900 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to align frames of a content for generating animated images and/or facilitating video stabilization. Various embodiments provide a mechanism in which alignment of the frames includes selecting a frame (such as the first frame) as a base frame and modifying the base frame repeatedly for determining matching feature points in the remaining frames. Various embodiments provide less computationally intensive solutions to aligning the frames of the content as matching of feature points of each frame with other frames is not required, rather computations are performed only on the base frame to align the remaining frames to the base frame. Various embodiments also use information of ROI while aligning the remaining frames to the base frame, as consideration of the ROI while determining a transformation matrix between two frames is a reliable solution in applications such as generation of animated images.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
accessing a set of feature points in a first frame of a content, wherein the first frame selected from a plurality of frames of the content;
aligning a second frame of the content to the first frame based on determining a transformation matrix between the second frame and the first frame, wherein the transformation matrix is determined based on matching the set of feature points in the first frame with a corresponding set of feature points in the second frame; and
aligning at least one subsequent frame from the second frame to the first frame, wherein a subsequent frame is aligned to the first frame by performing:
generating a modified first frame of the first frame based at least on a transformation matrix between a preceding frame of the subsequent frame and the first frame; and
determining a transformation matrix between the subsequent frame and the first frame for aligning the subsequent frame to the first frame, wherein the transformation matrix is determined based on matching a set of feature points in the modified first frame with a corresponding set of feature points in the subsequent frame.

2. The method as claimed in claim 1, wherein aligning the second frame to the first frame comprises:
determining the set of feature points in the second frame corresponding to the set of feature points in the first frame based on matching the set of feature points of the first frame to feature points in the second frame;
determining a transformation matrix between the set of feature points in the second frame and the set of feature points in first frame; and generating a warped frame of the second frame corresponding to the first frame based on the transformation matrix, wherein the warped frame is aligned to the first frame.

3. The method as claimed in claim 2, wherein generating the transformation matrix comprises:
  accessing a region of interest (ROI) associated with the first frame;
  computing a plurality of transformation matrices based on correspondences between the set of feature points in the first frame and the set of feature points in the second frame;
  determining a number of inliers in the plurality of transformation matrices based on the ROI; and
  selecting the transformation matrix from the plurality of transformation matrices based on a number of inliers in the plurality of transformation matrices.

4. The method as claimed in claim 3, wherein determining the number of inliers comprises one of:
  selecting a smaller error tolerance value for a feature point near a boundary of the ROI as compared to a feature point lying farther from the boundary of the ROI; or
  selecting a uniform error tolerance value for feature points and selecting weights to the feature points based on distances of the feature points from the boundary of the ROI.

5. The method as claimed in claim 2, wherein determining a feature point in a second frame corresponding to a feature point in a first frame comprises:
  determining one or more cross-correlation matching of feature points lying in a window of pre-determined number of pixels in the second frame around the feature point in the first frame with the feature point in the first frame; and
  selecting the feature point in the second frame having a maximum cross-correlation matching from among the one or more cross-correlation matching.

6. The method as claimed in claim 1, further comprising:
  detecting a displacement between the first frame and the subsequent frame; and
  selecting the preceding frame of the subsequent frame as the first frame, if the displacement between the first frame and the subsequent frame is greater than a threshold displacement.

7. The method as claimed in claim 1, wherein aligning the subsequent frame to the first frame comprises:
  determining a modified first frame of the first frame based on a warped frame of a preceding frame of the subsequent frame corresponding to the first frame;
  determining a set of search points based on the first frame and a transformation matrix between the first frame and the preceding frame;
  determining a set of feature points in the subsequent frame corresponding to a set of feature points in the modified first frame based on the set of search points;
  determining a transformation matrix between the set of feature points in the subsequent frame and the set of feature points in the modified first frame; and
  generating a warped frame of the subsequent frame with respect to the first frame based on the transformation matrix between the set of feature points in the subsequent frame and the set of feature points in the modified first frame, wherein the warped frame of the subsequent frame is aligned to the first frame.

8. The method as claimed in claim 7, wherein generating the transformation matrix comprises:
  accessing a region of interest (ROI) associated with the first frame;
  computing a plurality of transformation matrices based on correspondences between the set of feature points in the first modified frame and the set of feature points in the subsequent frame;
  determining a number of inliers in the plurality of transformation matrices based on the ROI; and
  selecting the transformation matrix from the plurality of transformation matrices based on a number of inliers in the plurality of transformation matrices.

9. The method as claimed in claim 8, wherein determining the number of inliers comprises one of:
  selecting a smaller error tolerance value for a feature point near a boundary of the ROI as compared to a feature point lying farther from the boundary of the ROI; or
  selecting a uniform error tolerance value for feature points and selecting weights to the feature points based on distances of the feature points from the boundary of the ROI.

10. An apparatus comprising:
  at least one processor; and
  at least one memory comprising computer program code, the at least one memory and the computer program code configured to, with the at least one processor, cause the apparatus to at least perform:
    access a set of feature points in a first frame of a content, wherein the first frame selected from a plurality of frames of the content;
    align a second frame of the content to the first frame based on determining a transformation matrix between the second frame and the first frame, wherein the transformation matrix is determined based on matching the set of feature points in the first frame with a corresponding set of feature points in the second frame; and
    align at least one subsequent frame from the second frame to the first frame, wherein a subsequent frame is aligned to the first frame by performing:
      generate a modified first frame of the first frame based at least on a transformation matrix between a preceding frame of the subsequent frame and the first frame; and
      determine a transformation matrix between the subsequent frame and the first frame for aligning the subsequent frame to the first frame, wherein the transformation matrix is determined based on matching a set of feature points in the modified first frame with a corresponding set of feature points in the subsequent frame.

11. The apparatus as claimed in claim 10, wherein the apparatus is further caused, at least in part to align the second frame to the first frame by:
  determine the set of feature points in the second frame corresponding to the set of feature points in the first frame based on matching the set of feature points of the first frame to feature points in the second frame;
  determine a transformation matrix between the set of feature points in the second frame and the set of feature points in first frame; and
  generate a warped frame of the second frame corresponding to the first frame based on the transformation matrix, wherein the warped frame is aligned to the first frame.

12. The apparatus as claimed in claim 11, wherein the apparatus is further caused, at least in part to generate the transformation matrix by:

access a region of interest (ROI) associated with the first frame;
compute a plurality of transformation matrices based on correspondences between the set of feature points in the first frame and the set of feature points in the second frame;
determine a number of inliers in the plurality of transformation matrices based on the ROI; and
select the transformation matrix from the plurality of transformation matrices based on a number of inliers in the plurality of transformation matrices.

13. The apparatus as claimed in claim 12, wherein the apparatus is further caused, at least in part to determine the number of inliers by one of:
   selecting a smaller error tolerance value for a feature point near a boundary of the ROI as compared to a feature point lying farther from the boundary of the ROI; or
   selecting a uniform error tolerance value for feature points and selecting weights to the feature points based on distances of the feature points from the boundary of the ROI.

14. The apparatus as claimed in claim 11, wherein the apparatus is further caused, at least in part to determine a feature point in a second frame corresponding to a feature point in a first frame by:
   determine one or more cross-correlation matching of feature points lying in a window of pre-determined number of pixels in the second frame around the feature point in the first frame with the feature point in the first frame; and
   select the feature point in the second frame having a maximum cross-correlation matching from among the one or more cross-correlation matching.

15. The apparatus as claimed in claim 10, wherein the apparatus is further caused, at least in part to perform:
   detect a displacement between the first frame and the subsequent frame; and
   select the preceding frame of the subsequent frame as the first frame, if the displacement between the first frame and the subsequent frame is greater than a threshold displacement.

16. The apparatus as claimed in claim 10, wherein the apparatus is further caused, at least in part to align the subsequent frame to the first frame by:
   determine a modified first frame of the first frame based on a warped frame of a preceding frame of the subsequent frame corresponding to the first frame;
   determine a set of search points based on the first frame and a transformation matrix between the first frame and the preceding frame;
   determine a set of feature points in the subsequent frame corresponding to a set of feature points in the modified first frame based on the set of search points;
   determine a transformation matrix between the set of feature points in the subsequent frame and the set of feature points in the modified first frame; and
   generate a warped frame of the subsequent frame with respect to the first frame based on the transformation matrix between the set of feature points in the subsequent frame and the set of feature points in the modified first frame, wherein the warped frame of the subsequent frame is aligned to the first frame.

17. The apparatus as claimed in claim 16, wherein the apparatus is further caused, at least in part to generate the transformation matrix by:
   access a region of interest (ROI) associated with the first frame;
   compute a plurality of transformation matrices based on correspondences between the set of feature points in the first modified frame and the set of feature points in the subsequent frame;
   determine a number of inliers in the plurality of transformation matrices based on the ROI; and
   select the transformation matrix from the plurality of transformation matrices based on a number of inliers in the plurality of transformation matrices.

18. The apparatus as claimed in claim 17, wherein the apparatus is further caused, at least in part to determine the number of inliers by one of:
   selecting a smaller error tolerance value for a feature point near a boundary of the ROI as compared to a feature point lying farther from the boundary of the ROI; or
   selecting a uniform error tolerance value for feature points and selecting weights to the feature points based on distances the feature points from the boundary of the ROI.

19. A computer program product comprising at least one non-transitory computer-readable storage medium, the non-transitory computer-readable storage medium comprising a set of instructions, which, when executed by one or more processors, cause an apparatus to at least perform:
   access a set of feature points in a first frame of a content, wherein the first frame selected from a plurality of frames of the content;
   align a second frame of the content to the first frame based on determining a transformation matrix between the second frame and the first frame, wherein the transformation matrix is determined based on matching the set of feature points in the first frame with a corresponding set of feature points in the second frame; and
   align at least one subsequent frame from the second frame to the first frame, wherein a subsequent frame is aligned to the first frame by performing:
      generate a modified first frame of the first frame based at least on a transformation matrix between a preceding frame of the subsequent frame and the first frame; and
      determine a transformation matrix between the subsequent frame and the first frame for aligning the subsequent frame to the first frame, wherein the transformation matrix is determined based on matching a set of feature points in the modified first frame with a corresponding set of feature points in the subsequent frame.

20. The computer program product as claimed in claim 19, wherein the apparatus is further caused, at least in part to align the second frame to the first frame by:
   determine the set of feature points in the second frame corresponding to the set of feature points in the first frame based on matching the set of feature points of the first frame to feature points in the second frame;
   determine a transformation matrix between the set of feature points in the second frame and the set of feature points in first frame; and
   generate a warped frame of the second frame corresponding to the first frame based on the transformation matrix, wherein the warped frame is aligned to the first frame.

* * * * *